Patented June 16, 1953

2,642,441

UNITED STATES PATENT OFFICE 2,642,441

CHEMICAL COMPOUNDS AND PROCESSES OF PREPARING THE SAME

Martin Seidman, Badger, and Karl Paul Link, Middleton, Wis., assignors to Wisconsin Alumni Research Foundation, Madison, Wis., a corporation of Wisconsin No Drawing. Application August 21, 1950, Serial No. 180,698

2 Claims. (Cl. 260—343.2)

The present invention relates to new chemical compounds and processes of preparing the same. More specifically, the present invention is directed to 3,4-substituted coumarins and improved processes of preparing the same. The products of the present invention are of interest in the anticoagulant field generally and the rodenticide field specifically, and may be used as intermediates for the preparation of other products.

Shortly after the anticoagulant 3,3'-methylenebis (4-hydroxycoumarin) was isolated from spoiled sweet clover hay, identified, and synthesized, its marked toxicity in the rat was noted. R. S. Overman, J. B. Field, C. A. Baumann, and K. P. Link, J. Nutrition, 23, 589 (1942); K. P. Link, Harvey Lecture Series, 39, 162 (1943-44). The results of a recent survey in the rodenticide field have shown that 3-(α-acetonylbenzyl)-4-hydroxycoumarin (I), known in the art as warfarin, is approximately fifty times more lethal and in addition the time to effect kill is about half that required by 3,3'-methylenebis (4-hydroxycoumarin).

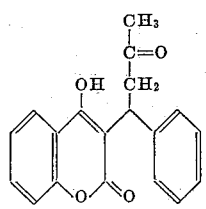

I

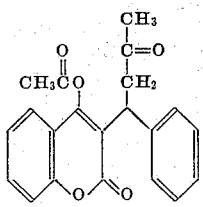

II

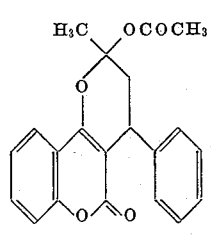

III

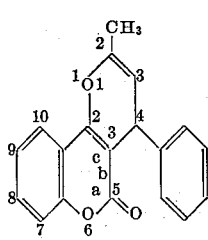

IV

In the formulas (I) represents 3-(α-acetonylbenzyl)-4-hydroxycoumarin; (II) represents 3-(α-acetonylbenzyl)-4-hydroxycoumarin acetate; (III) represents 2-methyl-2-acetoxy-4-phenyl-5-oxodihydropyrano (3,2-c) (1) benzopyran; and (IV) represents 2 - methyl - 4 - phenyl - 5 - oxo-γ-pyrano (3,2-c) (1) benzopyran. Acetylation of (I), an improved process of preparation of which is described below, has produced the three derivatives (II), (III) and (IV). Attempted acylation of (I) by refluxing with propionic anhydride or chloroacetyl chloride or by treatment with propionic anhydride containing perchloric acid resulted in the formation of (IV). The propionate ester may be prepared by reaction of (I) with propionic anhydride in pyridine. In a similar manner using the corresponding acid chlorides the benzoate, p-nitro-benzoate and p-toluenesulfonate esters may be prepared.

The following examples will serve to illustrate the present invention.

*3-(α-acetonylbenzyl)-4-hydroxycoumarin (I)*

Eleven grams of 4-hydroxycoumarin and 10 g. of benzalacetone were refluxed for four hours in 40 ml. of dioxane containing 1 ml. of piperidine. The solution was then cooled and poured into 1 l. of ice and water with vigorous stirring. An oil separated which gradually crystallized. The solid was filtered and recrystallized from acetone-water, giving the desired product with a melting point of 161° C.

*3-(α-acetonylbenzyl)-4-hydroxycoumarin acetate (II)*

Twenty grams of 3-(α-acetonylbenzyl)-4-hydroxycoumarin was refluxed with 150 ml. of acetic anhydride for one hour. After cooling, the solution was poured into 1 l. of ice and water with vigorous stirring. An oil separated which turned to a gum and then a solid. After filtration and recrystallization from methanol the desired product was obtained, m. p. 117–118° C.

*2 - methyl - 4 - phenyl - 5 - oxo-γ-pyrano(3,2-c)-benzopyran (IV)*

This compound was prepared from 3-(α-acetonylbenzyl)-4-hydroxycoumarin (I) by the following procedures:

*a.* REACTION WITH ACETIC ANHYDRIDE AND PERCHLORIC ACID

Four grams of (I) was suspended in 25 ml. of acetic anhydride and two drops of perchloric acid was added. Upon shaking, the solid gradually dissolved. After five minutes a white crystalline material separated. This was immediately filtered and washed with glacial acetic acid. The resulting product (IV) melted at 145–146° C. By pouring the mother liquor into ice water an additional amount of the desired product may be recovered.

*b.* REACTION WITH PROPIONIC ANHYDRIDE

Five grams of (I) was refluxed with 40 ml. of propionic anhydride for one hour. The solution was cooled and poured into 500 ml. of ice and water. An oil separated. The water was decanted and 50 ml. of methanol was added, whereupon the oil crystallized. After two recrystallizations from methanol the desired product (M. P. 145–146° C.) was obtained.

c. REACTION WITH PROPIONIC ANHYDRIDE AND PERCHLORIC ACID

Four grams of (I) was suspended in 30 ml. of propionic anhydride containing two drops of perchloric acid. After fifteen minutes the clear yellow solution was poured into 500 ml. of ice and water with stirring. The oil which separated was treated with 50 ml. of methanol whereupon crystals of the desired product were obtained, M. P. 145–146° C.

d. REACTION WITH CHLOROACETYL CHLORIDE

Four grams of (I) was refluxed with 40 ml. of chloroacetyl chloride for one hour. After cooling the solution was poured into 500 ml. of ice and water. An oil formed which was separated from the water layer and crystallized by the addition of 50 ml. of methanol. After two recrystallizations from methanol the desired product (M. P. 145–146° C.) was obtained.

2-methyl-2-acetoxy-4-phenyl-5-oxodihydropyrano (3,2-c) (1) benzopyran (III)

Five grams of 3-(α-acetonylbenzyl)-4-hydroxycoumarin was suspended in 60 ml. of acetic anhydride and two drops of perchloric acid added. After shaking for three minutes almost all of the solid had dissolved. The mixture was then immediately poured into 500 ml. of ice and water with stirring. A gum formed which gradually solidified. The precipitate was filtered and recrystallized from isopropyl alcohol yielding a product with a melting point of 185–195° C. Two recrystallizations from methanol raised the melting point of the desired product to 204–205° C.

From the mother liquor a small amount of pure 2-methyl-4-phenyl-5-oxo-γ-pyrano(3,2-c)-(1)benzopyran(IV) was also obtained.

3-(α-acetonylbenzyl)-4-hydroxycoumarin propionate

A mixture of 3.1 g. of 3-(α-acetonylbenzyl)-4-hydroxycoumarin, 3 ml. of propionic anhydride and 25 ml. of dry pyridine was allowed to stand for six days at room temperature. The solution was then poured into 500 ml. of ice and water with stirring. The gum which formed was dissolved in 40 ml. of hot methanol. Upon cooling the desired product crystallized out. After two recrystallizations from methanol the M. P. was 135–137° C.

3-(α-acetonylbenzyl)-4-hydroxycoumarin benzoate

To a solution of 10 g. of 3-(α-acetonylbenzyl)-4-hydroxycoumarin in 40 ml. of dry pyridine was added 5.8 g. of benzoyl chloride at room temperature. Crystals formed immediately. After three hours the mixture was poured into 500 ml. of ice and water with stirring. The resulting solid was filtered and after four recrystallizations from acetone-water the desired product, M. P. 117–119° C, was obtained.

3-(α-acetonylbenzyl)-4-hydroxycoumarin p-nitrobenzoate

This ester is prepared in accordance with the process employed in preparing the benzoate ester, by the use of 6.3 g. of p-nitrobenzoyl chloride in place of the benzoyl chloride employed in the above example. The desired p-nitrobenzoate ester is obtained with a melting point of 194–196° C.

3-(α-acetonylbenzyl)-4-hydroxycoumarin p-toluenesulfonate

A mixture of 15 g. of 3-(α-acetonylbenzyl)-4-hydroxycoumarin, 10 g. of p-toluenesulfonyl chloride and 60 ml. of dry pyridine was allowed to stand for five days at room temperature. The resulting clear yellow solution was poured into 500 ml. of ice and water with stirring yielding a gum. After decantation of the water solution, 100 ml. of hot methanol was added, inducing crystallization. The precipitate was filtered and after two recrystallizations from acetone-water, the M. P. of the desired tosyl ester was 169–170° C.

The acyloxy derivatives are all active anticoagulants. Investigations show them to be more active than 3,3′-methylenebis(4-hydroxycoumarin) i. e. "Dicumarol."

We claim:

1. The product, 2-methyl-4-phenyl-5-oxo-γ-pyrano (3,2-c) (1) benzopyran.

2. The process of preparing the compound of claim 1 which comprises reacting 3-(α-acetonylbenzyl)-4-hydroxycoumarin with a reactant selected from the group consisting of a mixture of acetic anhydride and perchloric acid; a mixture of propionic anhydride and perchloric acid; propionic anhydride, and chloroacetyl chloride.

MARTIN SEIDMAN.
KARL PAUL LINK.

No references cited.